March 11, 1952 L. LEE, II 2,588,546
CONTROL APPARATUS FOR INTERNAL-COMBUSTION ENGINES
Filed Aug. 8, 1946 2 SHEETS—SHEET 2

Fig. 2

INVENTOR.
LEIGHTON LEE II
BY Lester W Clark
AGENT

UNITED STATES PATENT OFFICE 2,588,546

CONTROL APPARATUS FOR INTERNAL-COMBUSTION ENGINES

Leighton Lee, II, Rocky Hill, Conn., assignor, by mesne assignments, to Niles-Bement-Pond Company, West Hartford, Conn., a corporation of New Jersey Application August 8, 1946, Serial No. 689,221

30 Claims. (Cl. 123—119)

The present invention relates to control apparatus for internal combustion engines, and particularly to apparatus for controlling the fuel and air supply mechanism so as to maintain a constant fuel-air ratio under all conditions of engine operation.

An object of the present invention is to provide an improved fuel and air control system for internal combustion engines.

Another object is to provide such an improved system in which the fuel flow is manually controlled and the air flow is automatically controlled to maintain it proportional to the fuel flow.

Another object is to provide an improved fuel and air control system of the type described, in which improved means is provided for controlling the flow of fuel and air under engine idling conditions.

Another object is to provide a system of the type described including improved means for maintaining a constant fuel-air ratio after the automatically controlled throttle has reached its wide open position.

A further object is to provide, in a system of the type described, improved means for regulating a supercharging blower so as to maintain a constant fuel-air ratio under wide open throttle conditions.

Other objects and advantages of the present invention will become apparent from a consideration of the appended specification, claims, and drawings, in which:

Figure 1:
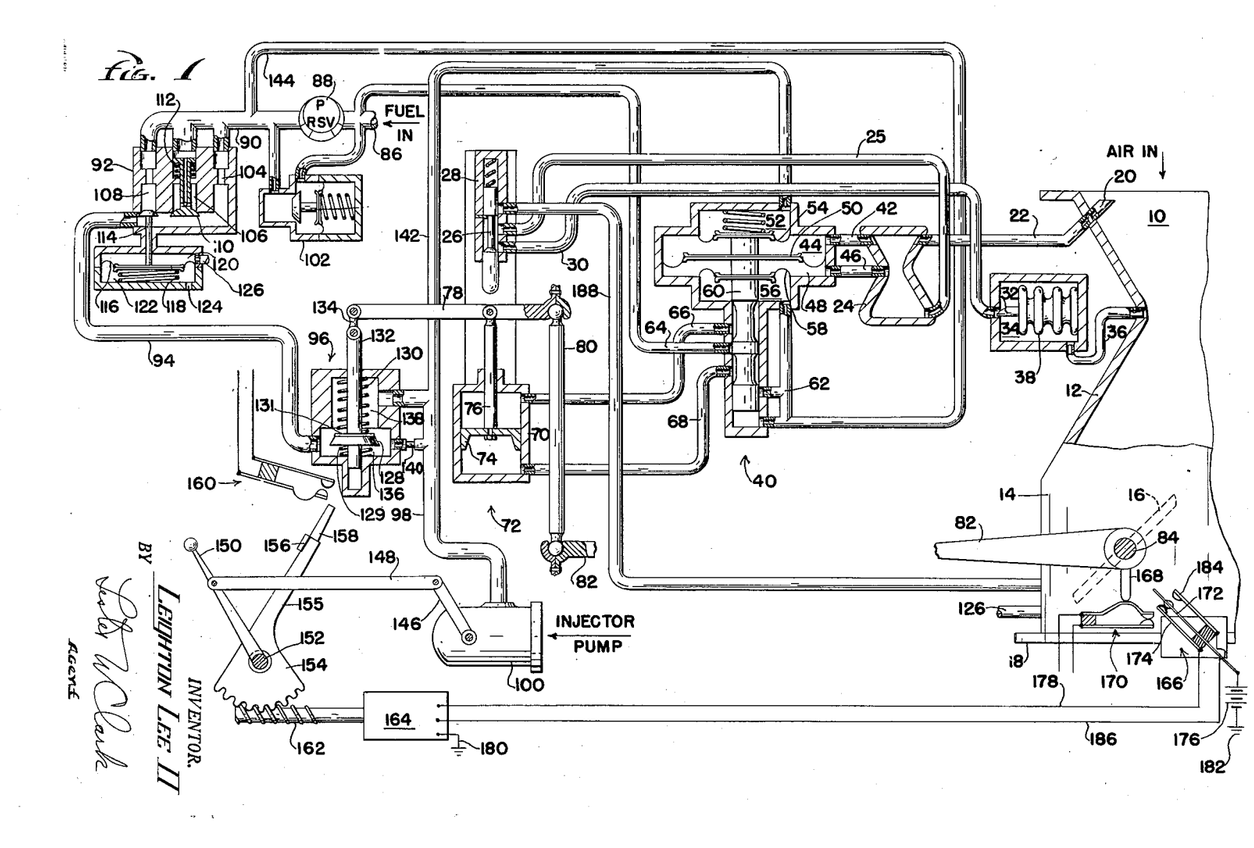
Figure 1 illustrates, somewhat diagrammatically, a fuel and air supply system for an internal combustion engine, embodying the principles of my invention.

Referring to Figure 1, there is shown an air intake system including an entrance 10, a venturi 12, and a passage 14 controlled by a pair of throttle blades, one of which is shown at 16. The lower end of the passage 14 is provided with a flange 18, by which it may be mounted on the intake of a blower for supercharging an internal combustion engine.

An impact tube 20 is provided, having an open end projecting into the entrance 10 to receive the impact of the flowing air entering the venturi 12.

The venturi 12 sets up a pressure differential between the entrance 10 and the throat of the venturi which is a measure of the volume of air flowing to the engine per unit time. This pressure differential causes a flow of air thru a secondary air conduit which may be traced from the impact tube 20 thru a conduit 22, a boost venturi 24, a conduit 25, past a valve 26 in a valve casing 28, thru a conduit 30 and past a valve 32 into a chamber 34, and from the chamber 34 thru a conduit 36 to the throat of venturi 12.

The valve 32 is operated by a bellows 38 mounted in the chamber 34. The bellows 38 is sealed, and is preferably filled with a fluid having an appreciable coefficient of thermal expansion, so that the bellows 38 expands and contracts with variations of pressure and temperature in the chamber 34. The bellows 38 therefore may be said to respond to the density in the chamber 34. The valve 32 is contoured to vary the air flow thru the secondary conduit just traced in accordance with changes in air density, in such a manner that the pressure drop between the entrance and throat of the boost venturi 24 is a true measure of the mass of air flowing per unit time thru the main venturi 12.

The action of the boost venturi 24 and the density compensating bellows 38 is more completely described and claimed in the patent to Harold F. Twyman, #2,391,755, dated December 25, 1945, and assigned to the assignee of the present application.

The air pressure differential between the entrance and throat of the boost venturi 24 is communicated to a servo-motor control valve mechanism generally indicated at 40. A conduit 42 connects the entrance to the boost venturi and a chamber 44 in the control valve mechanism. Another conduit 46 connects the throat of boost venturi 24 with a chamber 48 in the control valve mechanism 40. The chambers 44 and 48 are separated from each other by a flexible diaphragm assembly 50. The valve mechanism 40 also includes a chamber 52 separated from chamber 44 by a diaphragm 54, and a chamber 56 separated from chamber 48 by a diaphragm 58. The diaphragms 54, 50 and 58 are connected at their centers to a spool valve generally indicated at 60.

The valve 60 is a conventional type of servo-motor control valve. It controls the selective connection of a high pressure supply conduit 62 and a low pressure drain conduit 64 with control conduits 66 and 68 leading to the opposite ends of a cylinder 70 in a servo-motor generally indicated at 72. A piston 74 is slidable within the cylinder 70, and actuates a rod 76 which is pivotally attached at its opposite end to a floating lever 78.

The right end of lever 78 is connected by a ball and socket joint to a link 80, whose opposite end is connected by a similar joint to an arm 82, which is fixed on the shaft 84 of throttle 16.

Fuel flows to the engine from a tank (not shown) thru an inlet 86, a fuel transfer pump 88, a conduit 90, a jet system 92, a conduit 94, an idle control mechanism 96, and a conduit 98 to an injector pump mechanism schematically indicated at 100. This injector pump mechanism may be of the type shown and claimed in the co-pending application of George W. Baierlein, Serial No. 650,408, filed February 27, 1946, now Patent No. 2,455,289 granted November 30, 1948.

The pump 88 is provided with a pressure relief valve 102, of generally conventional form, which maintains a substantially constant pressure at the discharge side of pump 88.

The jet system 92 includes a fixed metering restriction 104, and parallel passages 106 and 108. The flow thru passage 106 is controlled by a valve 110 biased to closed position by a spring 112 and movable in an opening direction by the pressure differential across the metering restriction 104. The flow thru passage 108 is controlled by a valve 114, operated by a diaphragm 116. A spring 118 biases the valve 114 toward closed position. The diaphragm 116 separates a pair of expansible chambers 120 and 122. The chamber 122 is vented to atmosphere as indicated at 124. The chamber 120 is connected thru a conduit 126 to the main air passage 14 at a point on the downstream side of throttle 16. When the pressure in the main air passage downstream from the throttles increases above a value determined by the strength of spring 118, then the valve 114 is opened. In effect, there is provided a shift from a lean to a rich mixture in response to manifold pressure. If desired, the more usual manual mixture control could be used in its place.

The idle control mechanism 96 includes a valve 128 biased to open position by a spring 130. Valve 128 is attached to a stem 132, whose upper end is connected by a link 134 to the left end of lever 78. Valve 128 controls the flow between a chamber 136 and a chamber 138. Chamber 138 is directly connected to the fuel conduit 98. Chamber 136 is connected to the fuel conduit 94 directly and is connected to conduit 98 thru a small restriction 140. When the valve 128 is open, fuel may flow directly from conduit 94 thru chambers 136 and 138 to conduit 98. When the valve 128 is closed, fuel must flow from conduit 94 to conduit 98 thru the small fixed restriction 140.

A conduit 142 communicates the pressure in the conduit 98 to the chamber 52 of the control valve mechanism 40. A conduit 144 serves to communicate the pressure in conduit 90 on the upstream side of the jet system to conduit 62 and thence to chamber 56 of the control valve mechanism 40.

The delivery of the injector pump is controlled by an arm 46 connected thru a link 148 to a manually movable control lever 150. The lever 150 is rotatable on a shaft 152. There is also rotatable on the shaft 152 a segmental gear 154, which carries at its upper end a stop 156 which projects into the path of movement of the manual lever 150. The arm 155 also carries at its tip a switch operating finger 158. The finger 158 operates a switch 160 in a manner more completely described in connection with Figure 2.

The segmental gear 154 engages a worm 162, driven by a reversible motor 164. The motor 164 is controlled by a single-pole, double-throw switch 166 operated by a finger 168 which moves with the throttle 16. The switch finger 168 also co-operates with another switch 170, for a purpose to be more completely described in connection with Figure 2.

*Operation of Figure 1—Cruising conditions*

The pilot, or some other member of the aircraft crew, by manipulation of lever 150, sets the position of the injector pump delivery control arm 146. For any given value of engine speed, this determines the flow of fuel to the engine. Under cruising conditions, the enrichment valves 110 and 114 are closed, and the idle valve 128 is open. At such times, all the fuel flows thru the fixed restriction 104, and the pressure drop across that restriction may be said to be a measure of the rate of flow of fuel to the engine. The pressure drop across restriction 104 is communicated thru conduits 144 and 142 to the chambers 56 and 52 in the control valve mechanism 40. There it acts on the valve 60 in an upward direction, since the higher pressure is communicated to the lower chamber 56. This upwardly acting fuel pressure differential, which is a measure of the rate of flow of fuel to the engine is opposed by the air pressure differential acting downwardly on the diaphragm 50. This air pressure differential is a measure of the mass rate of flow of the air to the engine.

As long as the forces acting on the valve 60 are balanced, the air flow is at the proper value to maintain the selected fuel-air ratio. The valve 60 then remains in its neutral position shown in the drawing. If the air flow becomes less than the amount necessary to maintain the required fuel-air ratio, then the force due to the fuel pressure differential becomes greater than the force due to the air pressure differential and the valve 60 is moved upwardly. This allows fuel at high pressure to flow from conduit 62 into chamber 56 and thence past valve 60 into conduit 66 and into the cylinder 70 at the upper side of piston 74. At the same time, the cylinder at the lower side of piston 74 is connected thru conduit 68 past valve 60 into drain conduit 64 which leads to the inlet side of the fuel pump 88. A considerable pressure differential is thus applied to piston 74, moving it downwardly. The left end of lever 78 remains stationary at this time, since valve 128 is wide open. The right end of lever 78 is therefore moved downwardly, carrying link 80 downwardly and moving arm 82 in a counter-clockwise direction, thereby opening throttle 16.

The opening movement of the throttle causes an increase in the air flow, thereby increasing the air pressure differential acting downwardly on diaphragm 50. The throttle 16 continues to open until the air pressure differential has increased sufficiently to balance the fuel pressure differential and move the valve 60 back to its neutral position.

In a similar manner, it may be seen that if the air flow becomes too great for the fuel flow, then the throttle will be operated in a closing direction until the air flow is reduced to balance the fuel flow.

As the altitude at which the aircraft is operating increases, the air becomes less dense, and it is therefore necessary to open the throttles more and more widely to provide the same mass air flow. After the throttle has reached its wide open position, the air flow cannot be increased any further by opening the throttle. If a constant fuel-to-air ratio is to be maintained thereafter, it must be done by reducing the fuel flow, rather than by increasing the air flow.

It should be noted that the movable contact 172 of the switch mechanism 166 is self-biased into engagement with the stationary contact 174. When contact 172 engages contact 174, an electric circuit is completed which may be traced from the upper terminal of battery 176, thru switch contacts 172 and 174, a conductor 178, motor 164 and ground connections 180 and 182 to the lower terminal of battery 176. This circuit energizes motor 164 for operation in a direction to drive the segmental gear 154 in a clockwise direction, thereby moving stop 156 toward its maximum position. Motor 164 is provided with a suitable internal limit switch (not shown), which interrupts the circuit just traced when the segmental gear reaches its maximum position, which is that shown in the drawing.

As the throttle reaches full open position, the switch finger 168 engages switch contact 172 and moves it out of engagement of stationary contact 174 and into engagement with stationary contact 184. This completes a circuit which may be traced from the upper terminal of battery 176 thru contacts 172 and 184, a conductor 186, and ground connections 180 and 182 to the lower terminal of battery 176.

Completion of this circuit energizes motor 164 to drive segmental gear 154 in a counter-clockwise direction. Stop 156 is moved along with the segmental gear until it engages arm 150 and rotates it counter-clockwise also. This reduces the fuel flow until the fuel pressure differential matches the air pressure differential in the control valve mechanism 40. As soon as the stop 156 moves slightly past the point where the fuel flow balances the air flow, then the valve 60 is moved downwardly so that the throttle starts to close again. When this happens, contact 172 moves away from contact 184, thereby de-energizing the circuit of motor 164 and stopping motion of the gear 154. This slight movement of the throttle by which the switch contact 172 is moved away from contact 184 is enough to reduce the air flow and again balance the air and fuel flows so that the valve 60 is restored to its neutral position.

The present system has very good acceleration characteristics as compared with a conventional system. In the present arrangement, an increase of power, or acceleration, is obtained by first increasing the fuel flow and thereafter increasing the air flow to balance the increased fuel flow. Any lag in the increase of the air flow merely causes enrichment during the acceleration period, which is generally desirable. In a conventional system, on the other hand, acceleration is obtained by increasing the air flow first and thereafter increasing the fuel flow to correspond with the increased air flow. Any lag in the increase of the fuel flow causes leaning out during the acceleration period, which is very undesirable and must be compensated for by the use of accelerating pumps, etc.

The system described provides constant power output at constant speed. If the engine is equipped with a speed governor such as a propeller pitch control, then a change in speed will produce a similar change in power output unless the manual control 150 is reset.

*Operation of Figure 1—Idling conditions*

The venturi 12 is constructed with a throat area large enough to handle the air flow required at maximum power output. Therefore, when the engine is idling, the air pressure differential set up in the venturi 12 is very small. At such times, that air pressure differential is a very inaccurate measure of the air flow. I have therefore provided means whereby the entire air flow under idling conditions is directed thru the boost venturi 24. At the same time, the small metering restriction 140 is substituted for the larger restriction 104 as the fuel metering restriction.

When it is desired to idle the engine, the pilot's control lever 150 is moved to the left almost as far as it will go. This reduces the fuel flow to the amount required to idle the engine. The control valve mechanism 40 responds to cause operation of the servo-motor piston 74 upwardly, thereby closing the throttle. At this time, the left end of lever 78 is held down by the spring 130. As the throttle approaches its closed position, the portion of lever 78 immediately above rod 76 engages the bottom end of valve 26 and moves it upwardly. This disconnects the discharge end of boost venturi 24 from conduit 30 which leads to the throat of main venturi 12, and connects it with a conduit 188 which leads to the main air passage 14 at the downstream side of the throttle. This greatly increases the air pressure differential across the boost venturi 24, thereby increasing the downward air pressure differential acting on diaphragm 50. The servo-motor piston 74 is thereby given an additional upward impulse, completing the shifting of valve 26 and disconnecting conduit 30 from conduit 25 completely. At the same time, the throttle 16 is completely closed by the action of servo-motor 72. The air pressure differential acting downwardly on diaphragm 50 is still considerably greater than the fuel pressure differential acting upwardly on the diaphragms 52 and 54. The piston 74 therefore continues to move upwardly. Since the throttle 16 has reached the limit of its movement, the lever 78 now pivots about its right hand end, and the valve 128 is closed against the force of the spring 130. When the valve 128 is closed, all the fuel must thereafter pass thru the small fixed restriction 140. Since this restriction is considerably smaller than restriction 104, a considerably higher fuel pressure differential is developed across it for the same amount of fuel flow. The ratio between the areas of restrictions 140 and 104 should be designed to correspond to the ratio between the areas of the throat of venturis 12 and 24. In this way a shift is accomplished in the relationship between the rate of air flow to the engine and the air pressure differential acting downwardly on valve 60, so that a considerably greater measuring force is available for a smaller air flow. At the same time, a new relationship is established between the fuel pressure differential and the rate of flow of fuel to the engine, so that a greater fuel pressure differential is obtained for a smaller value of fuel flow. The servo-motor control valve mechanism 40 continues to regulate the servo-motor 72. The valve 128 is biased upwardly by a spring 129 to rest against a stop 131 attached to stem 132. After the valve 128 is closed, continued upward movement of the stem 132 is permitted, since the stop 131 merely separates from valve 128 and continues its upward movement. This additional upward movement of stem 132 permits the servo-motor to operate the valve 26 so as to variably restrict the conduit 188. The valve 26 thereby operates as the air flow throttling valve under idle conditions. It is operated to regulate the air flow in the same manner as the main throttle valve 16 is operated under power output conditions.

Figure 2:
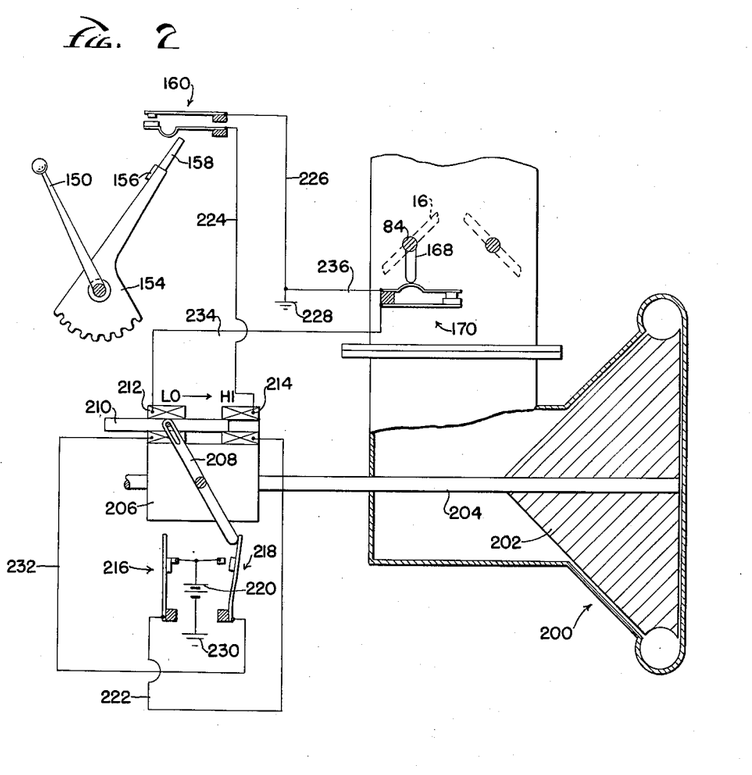
Figure 2 illustrates, somewhat diagrammatically, a system for controlling the speed of a supercharging blower which may be utilized in connection with the system of Figure 1.

*Figure 2*

There is shown in Figure 2 a control system for the gear shift controlling the drive ratio between the engine and a supercharger which may be used in connection with the system in Figure 1.

The supercharger blower is generally indicated at 200. It consists of a rotor 202 mounted on a shaft 204 driven by the engine thru a reduction gear mechanism generally indicated at 206. The reduction gear 206 is of the two-speed type, and is provided with a gear ratio control arm 208 movable from the low speed position shown on the drawing to a high speed position wherein the arm is displaced clockwise from its present position. The upper end of arm 208 is slotted to receive a pin attached to an armature 210 which co-operates with a pair of electro-magnets 212 and 214. The lower end of arm 208 co-operates with a pair of limit switches 216 and 218.

The switch 160 is the same as the switch 160 of Figure 1, and is operated by the finger 158 attached to the segmental gear 154. The switch 170 is the same as the switch 170 of Figure 1, and is operated by the finger 168 attached to the throttle shaft 84.

*Operation of Figure 2*

After the throttle of Figure 1 has reached its wide open position, and the motor 164 is driving the stop 156 to the left to limit the fuel flow so as to maintain a constant fuel-air ratio, after the stop 156 has moved a predetermined distance, the finger 158 engages and closes the switch 160. This completes an energizing circuit for the high speed electro-magnet 214 associated with the gear ratio control 206. This circuit may be traced from the upper terminal of a battery 220 thru switch 216, a conductor 222, electro-magnet 214, a conductor 224, switch 160, conductor 226, and ground connections 228 and 230 to the lower terminal of battery 220. Electro-magnet 214 is thereby energized, drawing armature 210 to the right, thereby moving the gear ratio control arm 208 to its high speed position and opening switch 216 to break the circuit just traced. The rate of flow of air to the engine is thereby suddenly increased. The increased air pressure differential causes the control valve mechanism 40 to cause operation of throttle 16 in a closing direction to balance the air and fuel flows. At this time, switch finger 172 is moved back against switch finger 174, thereby energizing the circuit which causes motor 164 to drive the stop 156 toward its full open position. The throttle 16 is moved toward its closed position until the air flow is rebalanced, as before.

If, with the gear ratio control 206 in its high speed position, the aircraft is operated so that it becomes necessary to close the throttle more than half-way in order to balance the air and fuel flows, then the switch 170 is closed. (The halfway position is chosen for example only. Any other desired throttle position could be used.) This completes an energizing circuit for the low speed electro-magnet 212. This circuit may be traced from the upper terminal of battery 220 thru switch 218, conductor 232, electro-magnet 212, conductor 234, switch 170, conductor 236 and the ground connections 228 and 230 to the lower terminal of battery 220.

Electro-magnet 212 is thereby energized, drawing the armature 210 to the left toward the position shown on the drawing, thereby operating the speed ratio control arm 208 to its low speed position and opening switch 218 to break the circuit last traced. This provides a sudden reduction in the rate of air flow to the engine. The control valve mechanism 40 responds to this reduction and opens the throttle 16 wider to compensate for it.

The spacing between the wide open position of stop 156 and switch 160 provides two distinct advantages. In the first place, it prevents establishment of an unstable situation where the system would rapidly shift the supercharger drive from low to high and back again continuously. In the second place, it prevents inefficiency which would be caused by the operation at high supercharger speed with part throttle. Such operation would be necessary if the shift from low to high were made too soon.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim as my invention:

1. A fuel injection control system for an internal combustion engine, comprising means for injecting fuel into the cylinders of the engine, manually operable means for controlling the flow of fuel from said injection means to said engine, means for measuring the flow of fuel to said engine, throttle means for controlling the flow of combustion air to said engine, means for measuring the flow of combustion air to said engine, means including both said measuring means for controlling said throttle means to maintain a substantially constant fuel-to-air ratio, movable means for limiting the movement of said fuel flow controlling means in a fuel flow increasing direction, means for moving said limiting means, and means responsive to the position of said throttle means for operating said moving means and effective when said throttle means reaches wide open position to limit increasingly the flow of fuel to said engine, so as to prevent variation in said fuel-to-air ratio due to a fuel flow increasing movement of said manually operable means after said throttle means has reached its wide open position.

2. Control apparatus for an internal combustion engine, comprising manually operable means for controlling the flow of fuel to said engine, means for measuring the flow of fuel to said engine, throttle means for controlling the flow of combustion air to said engine, means for measuring the flow of combustion air to said engine, means including both said measuring means for controlling said throttle means to maintain a substantially constant fuel-to-air ratio, a movable stop for limiting the movement of said fuel flow controlling means in a fuel flow increasing direction, a motor for positioning said stop, control means for said motor including a device biased to a first position wherein said motor drives said stop in a direction to decrease its limiting effect on the flow of fuel and movable from said first position to a second position wherein said motor drives said stop in a direction to increase its limiting effect on the flow of fuel, and means associated with said throttle means for moving said device from its first position to its second position when said throttle means reaches its wide open position.

3. Control apparatus for an internal combustion engine, comprising manually operable means for controlling the flow of fuel to said engine, means for measuring the flow of fuel to said engine, throttle means for controlling the flow of combustion air to said engine, means for measuring the flow of combustion air to said engine, means including both said measuring means for controlling said throttle means to maintain a substantially constant fuel-to-air ratio, a movable stop for limiting the movement of said fuel flow controlling means in a fuel flow increasing direction, a reversible electrical motor for positioning said stop, control means for said motor including a double-throw switch biased to a first position wherein said motor drives said stop in a direction to decrease its limiting effect on the flow of fuel and movable from said first position to a second position wherein said motor drives said stop in a direction to increase its limiting effect on the flow of fuel, and means associated with said throttle means for moving said switch from its first position to its second position when said throttle means reaches its wide open position.

4. Control apparatus for an internal combustion engine, comprising manually operable means for controlling the flow of fuel to said engine, means for measuring the flow of fuel to said engine, throttle means for controlling the flow of combustion air to said engine, means for measuring the flow of combustion air to said engine, means including both said measuring means for controlling said throttle means to maintain a substantially constant fuel-to-air ratio, a movable stop for limiting the movement of said fuel flow controlling means in a fuel flow increasing direction, a motor for positioning said stop, control means for said motor including a device biased to a first position wherein said motor drives said stop in a direction to decrease its limiting effect on the flow of fuel and movable from said first position to a second position wherein said motor drives said stop in a direction to increase its limiting effect on the flow of fuel, said device having an intermediate position between said first and second positions wherein said motor is stopped, and means associated with said throttle means for moving said device from its first position to its second position when said throttle means reaches its wide open position, so that when said throttle means reaches its wide open position, said stop is driven by said motor in a fuel flow decreasing direction until it engages and carries with it said fuel flow controlling means, whereupon said throttle controlling means responds to the decreased fuel flow to move said throttle means away from said wide open position, thereby moving said device to its intermediate position and stopping said motor.

5. Control apparatus for an internal combustion engine having a blower driven thereby for supplying combustion air thereto and a variable ratio gear drive mechanism connecting said engine and said blower, comprising manually operable means for controlling the flow of fuel to said engine, means for measuring the flow of fuel to said engine, throttle means for controlling the flow of combustion air to said engine, means for measuring the flow of combustion air to said engine, means including both said measuring means for controlling said throttle means to maintain a substantially constant fuel-to-air ratio, a movable stop for limiting the movement of said fuel flow controlling means in a fuel flow increasing direction, means responsive to the position of said throttle means for positioning said stop, said stop positioning means being effective when said throttle means reaches wide open position to move said stop to limit increasingly the fuel flow to said engine and effective in other positions of said throttle means to move said stop to its maximum fuel flow position, means for controlling the gear ratio of said drive mechanism, and means responsive to movement of said stop a predetermined distance from its maximum fuel flow position for operating said gear ratio controlling means to increase the speed of said blower.

6. Control apparatus for an internal combustion engine having a variable speed blower for supplying combustion air thereto, comprising manually operable means for controlling the flow of fuel to said engine, means for measuring the flow of fuel to said engine, throttle means for controlling the flow of combustion air to said engine, means for measuring the flow of combustion air to said engine, means including both said measuring means for controlling said throttle means to maintain a substantially constant fuel-to-air ratio, a movable stop for limiting the movement of said fuel flow controlling means in a fuel flow increasing direction, means responsive to the position of said throttle means for positioning said stop, said stop positioning means being effective when said throttle means reaches wide open position to move said stop to limit increasingly the fuel flow to said engine and effective in other positions of said throttle means to move said stop to its maximum fuel flow position, and means responsive to movement of said stop a predetermined distance from its maximum fuel flow position for increasing the speed of said blower.

7. Control apparatus for an internal combustion engine having a blower driven thereby for supplying combustion air thereto and a variable ratio gear drive mechanism connecting said engine and said blower, comprising manually operable means for controlling the flow of fuel to said engine, means for measuring the flow of fuel to said engine, throttle means for controlling the flow of combustion air to said engine, means for measuring the flow of combustion air to said engine, means including both said measuring means for controlling said throttle means to maintain a substantially constant fuel-to-air ratio, a movable stop for limiting the movement of said fuel flow controlling means in a fuel flow increasing direction, means responsive to the position of said throttle means for positioning said stop, said stop positioning means being effective when said throttle means reaches wide open position to move said stop to limit increasingly the fuel flow to said engine and effective in other positions of said throttle means to move said stop to its maximum fuel flow position, means for controlling the gear ratio of said drive mechanism, and movable between a first low blower speed position and a second high blower speed position, means responsive to movement of said stop a predetermined distance from its maximum fuel flow position for operating said gear ratio controlling means to its high blower speed position, and means responsive to movement of said throttle means a predetermined distance from its wide open position for operating said gear ratio controlling means to its low blower speed position.

8. Control apparatus for an internal combustion engine having a blower driven thereby for supplying combustion air thereto and a variable ratio gear drive mechanism connecting said engine and said blower, comprising manually operable means for controlling the flow of fuel to said engine, means for measuring the flow of fuel to said engine, throttle means for controlling the flow of combustion air to said engine, means for measuring the flow of combustion air to said engine, means including both said measuring means for controlling said throttle means to maintain a substantially constant fuel-to-air ratio, a movable stop for limiting the movement of said fuel flow controlling means in a fuel flow increasing direction, means responsive to the position of said throttle means for positioning said stop, said stop positioning means being effective when said throttle means reaches wide open position to move said stop to limit increasingly the fuel flow to said engine and effective in other positions of said throttle means to move said stop to its maximum fuel flow position, means for controlling the gear ratio of said drive mechanism, including first electrical circuit means effective when energized to cause operation of said blower at high speed, second electrical circuit means effective when energized to cause operation of said blower at low speed, first switch means for controlling said first circuit means and movable into circuit-closing position by said stop upon movement thereof a predetermined distance from its maximum fuel flow position, and second switch means for controlling said second circuit means and movable into circuit-closing position by said throttle means upon movement thereof a predetermined distance from its wide open position.

9. Control apparatus for an internal combustion engine, comprising a main passage for combustion air flowing to said engine, throttle means for controlling the flow of air thru said main passage, a secondary passage by-passing said throttle means, a valve in said secondary passage, means biasing said valve to closed position so as to positively prevent the flow of fluid therethrough, and means operated by said throttle means for opening said valve as said throttle means moves to its closed position.

10. Control apparatus for an internal combustion engine, comprising a main passage for combustion air flowing to said engine, throttle means for controlling the flow of air thru said main passage, a secondary passage by-passing said throttle means, a valve in said secondary passage, means biasing said valve to closed position, means operated by said throttle means for opening said valve as said throttle means moves to its closed position, means for measuring the flow of air thru said secondary passage, and means including said measuring means for controlling the ratio of fuel to air supplied to said engine when said throttle means is closed.

11. Control apparatus for an internal combustion engine, comprising a main passage for combustion air flowing to said engine, throttle means for controlling the flow of air thru said main passage, a secondary passage by-passing said throttle means, a valve in said secondary passage, means biasing said valve to closed position, means operated by said throttle means for opening said valve as said throttle means moves to its closed position, means for measuring the flow of air thru said secondary passage, and means for varying the flow of air thru said by-pass to control the ratio of fuel to air supplied to said engine under idling conditions.

12. Control apparatus for an internal combustion engine, comprising a main passage for combustion air flowing to said engine, throttle means for controlling the flow of air thru said main passage, a secondary passage by-passing said throttle means, a valve in said secondary passage, means biasing said valve to closed position, means operated by said throttle means for opening said valve as said throttle means moves to its closed position, means for measuring the flow of air thru said secondary passage, and means including said measuring means for operating said valve while said throttle means remains closed to control the ratio of fuel to air supplied to said engine under idling conditions.

13. Control apparatus for an internal combustion engine, comprising a main passage for combustion air flowing to said engine, throttle means for controlling the flow of air thru said main passage, a secondary passage by-passing said throttle means, a valve in said secondary passage, means biasing said valve to closed position, a conduit for fuel flowing to said engine, a main fuel passage and a smaller idle fuel passage connected in parallel to receive fuel from said fuel conduit, a fuel valve for blocking said main passage, said idle passage serving to restrict the flow of fuel to said engine when said main passage is closed by said fuel valve, means operated by said throttle means for opening the valve in said secondary air passage and closing the fuel valve as said throttle means moves to its closed position, and means for operating the valve in said secondary air passage while said throttle means and said fuel valve remain closed to control the ratio of fuel to air supplied to said engine under idling conditions.

14. Control apparatus for an internal combustion engine, comprising a main passage for combustion air flowing to said engine, a first venturi in said main passage, throttle means for controlling the flow of air thru said main passage, a secondary passage for combustion air flowing to said engine and leading from said main passage at the upstream side of said venturi, a secondary venturi in said secondary passage, selector valve means movable between a first position wherein the downstream side of said secondary venturi is connected to the throat of said first venturi and a second position wherein the downstream side of said secondary venturi is connected to said main passage at the downstream side of said throttle means, means biasing said selector valve means to said first position, and means operated as an incident to a closing movement of said throttle means to move said selector valve means to said second position.

15. Control apparatus for an internal combustion engine, comprising a main passage for combustion air flowing to said engine, a metering restriction in said main air passage for producing therein two unequal pressures whose difference varies with the rate of flow of air thru said restriction, throttle means downstream from said restriction for controlling the flow of air thru said main passage, a secondary passage for combustion air flowing to said engine and leading from said main passage at a point subject to the higher of said two unequal pressures, a venturi in said secondary passage, selector valve means controlling said secondary passage and movable between a first position wherein the downstream side of said venturi is connected to a point in said main passage subject to the lower of said two unequal pressures and a second position wherein the downstream side of said venturi is connected to said main passage at the downstream side of said throttle means, means biasing said selector valve means to said first position, means responsive to the pressure differential set up by said venturi for controlling said throttle means, and means operated as an incident to a closing movement of said throttle means to move said selector valve means to said second position.

16. Control apparatus for an internal combustion engine, comprising a main passage for combustion air flowing to said engine, a metering restriction in said main air passage for producing therein two unequal pressures whose difference varies with the rate of flow of air thru said restriction, throttle means downstream from said restriction for controlling the flow of air thru said main passage, a secondary passage for combustion air flowing to said engine and leading from said main passage at a point subject to the higher of said two unequal pressures, a venturi in said secondary passage, selector valve means controlling said secondary passage and movable between a first position wherein the downstream side of said venturi is connected to a point in said main passage subject to the lower of said two unequal pressures and a second position wherein the downstream side of said venturi is connected to said main passage at the downstream side of said throttle means, means biasing said selector valve means to said first position, means responsive to the pressure differential set up by said venturi for controlling said throttle means, means operated as an incident to a closing movement of said throttle means to move said selector valve means to said second position, and means responsive to said venturi pressure differential for controlling the air flow thru said secondary passage while said throttle means remains closed.

17. Control apparatus for an internal combustion engine, comprising a main passage for combustion air flowing to said engine, a metering restriction in said main air passage for producing therein two unequal pressures whose difference varies with the rate of flow of air thru said restriction, throttle means downstream from said restriction for controlling the flow of air thru said main passage, a secondary passage for combustion air flowing to said engine and leading from said main passage at a point subject to the higher of said two unequal pressures, a venturi in said secondary passage, selector valve means controlling said secondary passage and movable between a first position wherein the downstream side of said venturi is connected to a point in said main passage subject to the lower of said two unequal pressures and a second position wherein the downstream side of said venturi is connected to said main passage at the downstream side of said throttle means, means biasing said selector valve means to said first position, a conduit for fuel flowing to said engine, metering restriction means in said fuel conduit, means responsive to the fuel pressure differential across said metering restriction means and to the pressure differential set up by said venturi for controlling said throttle means, and means operated as an incident to a closing movement of said throttle means to move said selector valve means to said second position.

18. Control apparatus for an internal combustion engine, comprising a main passage for combustion air flowing to said engine, a metering restriction in said main air passage for producing therein two unequal pressures whose difference varies with the rate of flow of air thru said restriction, throttle means downstream from said restriction for controlling the flow of air thru said main passage, a secondary passage for combustion air flowing to said engine and leading from said main passage at a point subject to the higher of said two unequal pressures, a venturi in said secondary passage, selector valve means controlling said secondary passage and movable between a first position wherein the downstream side of said venturi is connected to a point in said main passage subject to the lower of said two unequal pressures and a second position wherein the downstream side of said venturi is connected to said main passage at the downstream side of said throttle means, means biasing said selector valve means to said first position, a conduit for fuel flowing to said engine, metering restriction means in said fuel conduit including a main metering restriction and a smaller idle metering restriction connected in parallel with said main restriction, a fuel valve for shutting off the flow thru said main metering restriction, means responsive to the fuel pressure differential across said metering restriction means and means responsive to the pressure differential set up by said venturi for controlling said throttle means, and means operated as an incident to a closing movement of said throttle means to move said selector valve means to said second position and to close said fuel valve.

19. Control apparatus for an internal combustion engine, comprising a main passage for combustion air flowing to said engine, a metering restriction in said main air passage for producing therein two unequal pressures whose difference varies with the rate of flow of air thru said restriction, throttle means downstream from said restriction for controlling the flow of air thru said main passage, a secondary passage for combustion air flowing to said engine and leading from said main passage at a point subject to the higher of said two unequal pressures, a venturi in said secondary passage, selector valve means controlling said secondary passage and movable between a first position wherein the downstream side of said venturi is connected to a point in said main passage subject to the lower of said two unequal pressures and a second position wherein the downstream side of said venturi is connected to said main passage at the downstream side of said throttle means, means biasing said selector valve means to said first position, a conduit for fuel flowing to said engine, metering restriction means in said fuel conduit including a main metering restriction and a smaller idle metering restriction connected in parallel with said main restriction, a fuel valve for shutting off the flow thru said main metering restriction, means biasing said fuel valve to open position, motor means, means responsive to the fuel pressure differential across said metering restriction means and to the pressure differential set up by said venturi for controlling said motor means, a floating lever, a connection between said motor means and an intermediate point on said lever, a connection between one end of said lever and said fuel valve, said one end normally being held stationary by said fuel valve biasing means, a connection between the other end of said lever and said throttle means, the movement of said other end being limited by the closure of said throttle means, said motor means being effective upon closure of said throttle means and continued call by said motor controlling means for movement of said lever in a throttle closing direction to move said lever against said fuel valve biasing means and thereby close said fuel valve, means engageable by an intermediate point on said lever for operating said selector valve means to its second position as said throttle means is moved to its closed position, and means associated with said selector valve means to increasingly restrict the flow of air thru said secondary air passage upon continued movement of said lever in the throttle closing direction after said selector valve means has been moved to its second position.

20. Control apparatus for an internal combustion engine, comprising a main passage for combustion air flowing to said engine, throttle means for controlling the flow of air thru said main passage, a secondary passage by-passing said throttle means, a valve in said secondary passage, means biasing said valve to closed position, a conduit for fuel flowing to said engine, a main fuel passage and a smaller idle fuel passage connected in parallel to receive fuel from said fuel conduit, a fuel valve for blocking said main passage, said idle passage serving to restrict the flow of fuel to said engine when said main passage is closed by said fuel valve, means biasing said fuel valve to open position, a floating lever, a connection between one end of said said lever and said fuel valve, said one end normally being held stationary by said fuel valve biasing means, a connection between the other end of said lever and said throttle means, the movement of said other end being limited by the closure of said throttle means, means for moving an intermediate point on said lever to position said throttle means, said moving means being operable upon closure of said throttle means to move said lever against said fuel valve biasing means and thereby close said fuel valve, means engageable by an intermediate point on said lever for operating said selector valve means to its second position as said throttle means is moved to its closed position, and means associated with said selector valve means to increasingly restrict the flow of air thru said secondary air passage upon continued movement of said lever in the throttle closing direction after said selector valve means has been moved to its second position.

21. Control apparatus for an internal combustion engine, comprising a conduit for fuel flowing to said engine, means for measuring the rate of flow of fuel thru said conduit including a main metering restriction and a smaller idle metering restriction connected in parallel with said main restriction, a fuel valve operable to shut off the flow thru said main restriction, means biasing said valve to open position, manually operable means for controlling the flow of fuel to said engine, a conduit for combustion air flowing to said engine comprising a main air passage, throttle means for controlling the flow of air thru said main passage, a secondary air passage by-passing said throttle means, a valve in said secondary passage, means biasing said last-mentioned valve to closed position, means for measuring the rate of flow of combustion air to said engine, means including both said measuring means for controlling said throttle means to maintain a substantially constant fuel-to-air ratio, means effective upon closure of said throttle means to open the valve in said secondary air passage and close the fuel valve which controls said main restriction, movable means for limiting the movement of said fuel flow controlling means in a fuel flow increasing direction, means for moving said limiting means, and means responsive to the position of said throttle means for operating said moving means and effective when said throttle means reaches wide open position to limit increasingly the flow of fuel to said engine, so as to prevent variation in said fuel-to-air ratio due to a fuel flow increasing movement of said manually operable means after said throttle means has reached its wide open position.

22. Control apparatus for an internal combustion engine, comprising a main passage for combustion air flowing to said engine, a metering restriction in said main air passage for producing therein two unequal pressures whose difference varies with the rate of flow of air thru said restriction, throttle means in said conduit spaced from said restriction for controlling the flow of air thru said main passage, a secondary passage for combustion air flowing to said engine, means including selector valve means for connecting said secondary passage to said main passage, said selector valve means being movable between a first position wherein the opposite ends of said secondary passage are subject to said two unequal pressures and a second position wherein the opposite ends of said secondary passage are connected to said main passage on opposite sides of said throttle means, means biasing said selector valve means to said first position, a venturi in said secondary passage, means responsive to the pressure differential set up by said venturi for controlling said throttle means, and means operated as an incident to a closing movement of said throttle means to move said selector valve means to said second position.

23. Control apparatus for an internal combustion engine, comprising a main passage for combustion air flowing to said engine, a metering restriction in said main air passage for producing therein two unequal pressures whose difference varies with the rate of flow of air thru said restriction, throttle means downstream from said restriction for controlling the flow of air thru said main passage, a secondary passage for combustion air flowing to said engine and leading from said main passage at a point subject to the higher of said two unequal pressures, a venturi in said secondary passage, selector valve means controlling said secondary passage and movable between a first position wherein the downstream side of said venturi is connected to a point in said main passage subject to the lower of said two unequal pressures and a second position wherein the downstream side of said venturi is connected to said main passage at the downstream side of said throttle means, means biasing said selector valve means to said first position, a conduit for fuel flowing to said engine, metering restriction means in said fuel conduit including a main metering restriction and a smaller idle metering restriction connected in parallel with said main restriction, a fuel valve for shutting off the flow thru said main metering restriction, means biasing said fuel valve to open position, motor means, means responsive to the fuel pressure differential across said metering restriction means and to the pressure differential set up by said venturi for controlling said motor means, a floating lever, a connection between said motor means and an intermediate point on said lever, a connection between one end of said lever and said fuel valve, said one end normally being held stationary by said fuel valve biasing means, and a connection between the other end of said lever and said throttle means, the movement of said other end being limited by the closure of said throttle means, said motor means being effective upon closure of said throttle means and continued call by said motor controlling means for movement of said lever in a throttle closing direction to move said lever against said fuel valve biasing means and thereby close said fuel valve.

24. Control apparatus for an internal combustion engine, comprising a main passage for combustion air flowing to said engine, a metering restriction in said main air passage for producing therein two unequal pressures whose difference varies with the rate of flow of air thru said restriction, throttle means downstream from said restriction for controlling the flow of air thru said main passage, a secondary passage for combustion air flowing to said engine and leading from said main passage at a point subject to the higher of said two unequal pressures, a venturi in said secondary passage, selector valve means controlling said secondary passage and movable between a first position wherein the downstream side of said venturi is connected to a point in said main passage subject to the lower of said two unequal pressures and a second position wherein the downstream side of said venturi is connected to said main passage at the downstream side of said throttle means, means biasing said selector valve means to said first position, a conduit for fuel flowing to said engine, metering restriction means in said fuel conduit including a main metering restriction and a smaller idle metering restriction connected in parallel with said main restriction, a fuel valve for shutting off the flow thru said main metering restriction, means biasing said fuel valve to open position, motor means, means responsive to the fuel pressure differential across said metering restriction means and to the pressure differential set up by said venturi for controlling said motor means, a floating lever, a connection between said motor means and an intermediate point on said lever, a connection between one end of said lever and said fuel valve, said one end normally being held stationary by said fuel valve biasing means, a connection between the other end of said lever and said throttle means, the movement of said other end being limited by the closure of said throttle means, said motor means being effective upon closure of said throttle means and continued call by said motor controlling means for movement of said lever in a throttle closing direction to move said lever against said fuel valve biasing means and thereby close said fuel valve, and means engageable by an intermediate point on said lever for operating said selector valve means to its second position as said throttle means is moved to its closed position.

25. Control apparatus for an internal combustion engine, comprising fuel conduit means for delivering fuel to the engine, metering restriction means in said fuel conduit to measure the fuel flow therethru, manually operable means for controlling the fuel flow thru said conduit, air conduit means for conveying combustion air to said engine, metering restriction means in said air conduit means to measure the air flow therethru, throttle means in said air conduit for controlling the air flow therethru, means responsive to the fuel and air pressure differentials established across the respective metering restriction means for positioning said throttle means, first means responsive to the position of said throttle means and effective upon movement of said throttle means to closed position to decrease the effective areas of both said metering restriction means so as to meter low flows of fuel and air more accurately, and second means responsive to the position of said throttle means and effective upon movement thereof to wide open position to limit the movement of said fuel flow controlling means in a fuel flow increasing direction.

26. Control apparatus for an internal combustion engine, comprising a conduit for combustion air flowing to said engine, a conduit for fuel flowing to said engine, air metering restriction means in said air conduit, fuel metering restriction means in said fuel conduit, manually operable means for controlling the flow thru one of said conduits, means responsive to the pressure differentials set up by both said metering restriction means for controlling the flow thru the other of said conduits, and means associated with one of said flow controlling means to decrease the effective areas of both said restriction means when the flow thru said one flow controlling means falls below a predetermined value, so as to meter low flows of fuel and air more accurately.

27. A fuel injection control system for an internal combustion engine comprising a fuel injection pump, an air conduit and a throttle therefor, means for manually controlling the delivery of the fuel pump, means for automatically controlling the throttle to vary the air flow as the fuel flow is varied, and means for limiting the fuel pump control, in the direction to increase the fuel flow, when said throttle reaches its full-open position.

28. A fuel injection control system for an internal combustion engine comprising means for injecting fuel into the cylinders of the engine, means for manually controlling the flow of fuel from said injection means to said engine, a passage for flowing combustion air to said engine having a throttle therein, means for automatically controlling the position of said throttle by said fuel flow so as to maintain a substantially constant balance between the rates of the fuel and air flows, and means for maintaining a substantially constant fuel/air ratio after said automatically controlled throttle has reached its wide open position.

29. A fuel injection control system for an internal combustion engine which has a supercharging blower, according to claim 28, including means for regulating said blower so as to maintain a substantially constant fuel/air ratio under wide-open throttle conditions.

30. A fuel injection control system for an internal combustion engine comprising means for injecting fuel into the cylinders of said engine, manually operable means for controlling the fuel flow from said injecting means to said engine, an air passage for supplying combustion air to said engine, including a throttle for controlling the flow of air through said air passage, means for automatically controlling the flow of air through said air passage in proportion to said fuel flow, so as to maintain a desired fuel/air mixture ratio under varied operating conditions of said engine, and means for limiting the opening movement of said manually operable means when said throttle reaches full-open position.

LEIGHTON LEE, II.

REFERENCES CITED

The following references are of record in the file of this patent:

UNITED STATES PATENTS

| Number | Name | Date |
|---|---|---|
| 1,956,657 | Scheel | May 1, 1934 |
| 2,399,077 | Udale | Apr. 23, 1946 |
| 2,447,267 | Mock | Aug. 17, 1948 |